(12) United States Patent
Saito et al.

(10) Patent No.: US 9,537,435 B2
(45) Date of Patent: Jan. 3, 2017

(54) STEPPING MOTOR AND TIMEPIECE PROVIDED WITH STEPPING MOTOR

(71) Applicant: CASIO COMPUTER CO., LTD., Shibuya-ku, Tokyo (JP)

(72) Inventors: Yuta Saito, Kokubunji (JP); Yohei Kawaguchi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 302 days.

(21) Appl. No.: 14/486,671

(22) Filed: Sep. 15, 2014

(65) Prior Publication Data

US 2015/0085625 A1   Mar. 26, 2015

(30) Foreign Application Priority Data

Sep. 20, 2013  (JP) .................................. 2013-195233

(51) Int. Cl.
| | | |
|---|---|---|
| *H02K 37/00* | (2006.01) | |
| *H02P 8/02* | (2006.01) | |
| *G04C 3/14* | (2006.01) | |
| *H02K 37/16* | (2006.01) | |

(52) U.S. Cl.
CPC ................. *H02P 8/02* (2013.01); *G04C 3/143* (2013.01); *H02K 37/16* (2013.01)

(58) Field of Classification Search
CPC ........... G04C 3/143; G04C 3/14; H02K 37/16; H02P 8/02
USPC ...... 310/49.01–49.55; 318/138, 696; 368/81, 368/155
See application file for complete search history.

(56) References Cited

U.S. PATENT DOCUMENTS

| | | | | |
|---|---|---|---|---|
| 4,066,947 A | * | 1/1978 | Nakajima ................ | G04C 3/14 310/49.26 |
| 4,204,397 A | * | 5/1980 | Asano .................... | G04C 3/143 368/155 |
| 4,321,520 A | * | 3/1982 | Ueda ........................ | H02P 8/02 318/647 |
| 4,370,065 A | * | 1/1983 | Kawamura ............ | G04C 3/143 318/696 |
| 4,673,857 A | * | 6/1987 | Inoue ....................... | H02P 8/02 318/685 |
| 4,912,692 A | * | 3/1990 | Kamens .................. | G04C 3/14 318/696 |
| 5,909,070 A | * | 6/1999 | Taghezout ............. | H02K 16/00 310/40 MM |

(Continued)

FOREIGN PATENT DOCUMENTS

| | | |
|---|---|---|
| CN | 102210093 A | 10/2011 |
| JP | 5006440 B2 | 1/1993 |

OTHER PUBLICATIONS

Chinese Office Action (and English translation thereof) dated Jul. 22, 2016, issued in counterpart Chinese Application No. 2014104836756.

*Primary Examiner* — Thanh Lam
(74) *Attorney, Agent, or Firm* — Holtz, Holtz & Volek PC

(57) ABSTRACT

Disclosed is a stepping motor including a rotor, a plurality of coils and a switching mechanism. The stepping motor simultaneously or sequentially applies driving pulses to the coils to rotate the rotor by a predetermined step angle, and while the driving pulses are being applied to part of the coils, the switching mechanism switches the rest of the coils other than the part of the coils driven by the driving pulses into a high impedance state.

5 Claims, 13 Drawing Sheets

(56) References Cited

U.S. PATENT DOCUMENTS

| | | | | |
|---|---|---|---|---|
| 5,917,257 A | * | 6/1999 | Taghezout | G04C 13/11 310/156.36 |
| 6,731,093 B1 | * | 5/2004 | Kalmbach | H02P 8/02 310/49.32 |
| 8,841,874 B2 | | 9/2014 | Wagner et al. | |
| 2009/0316535 A1 | * | 12/2009 | Ogasawara | G04C 3/143 368/80 |

* cited by examiner

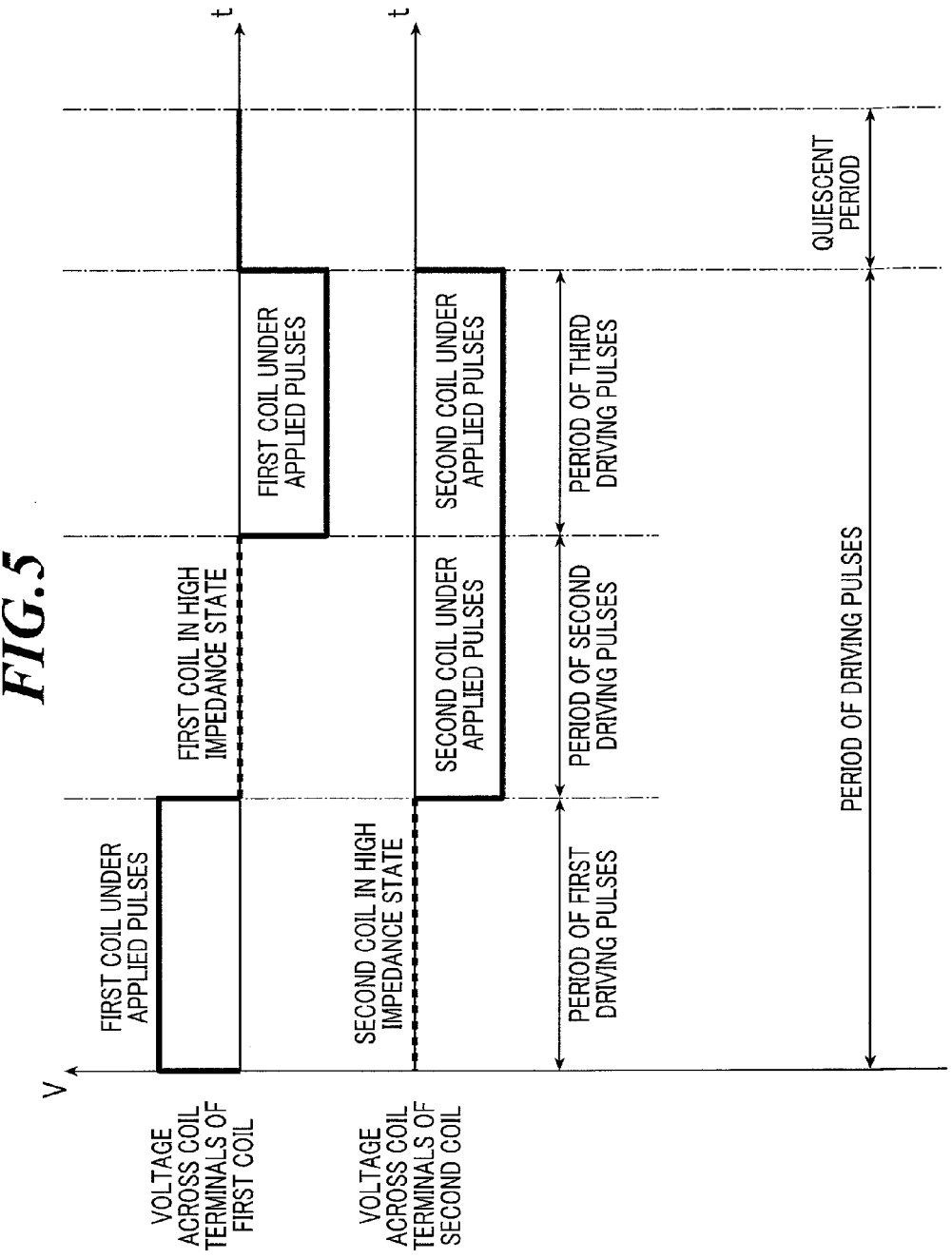

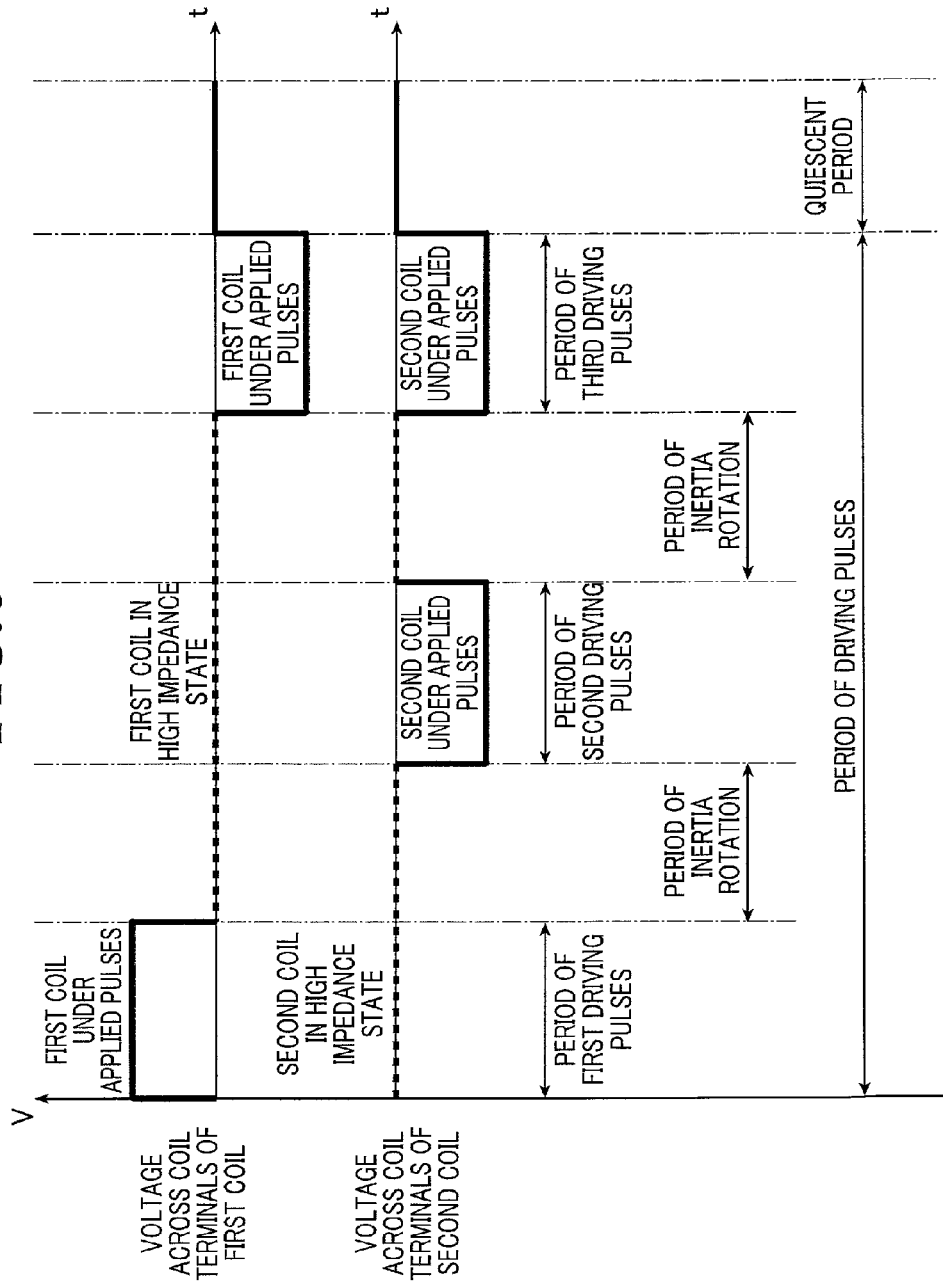

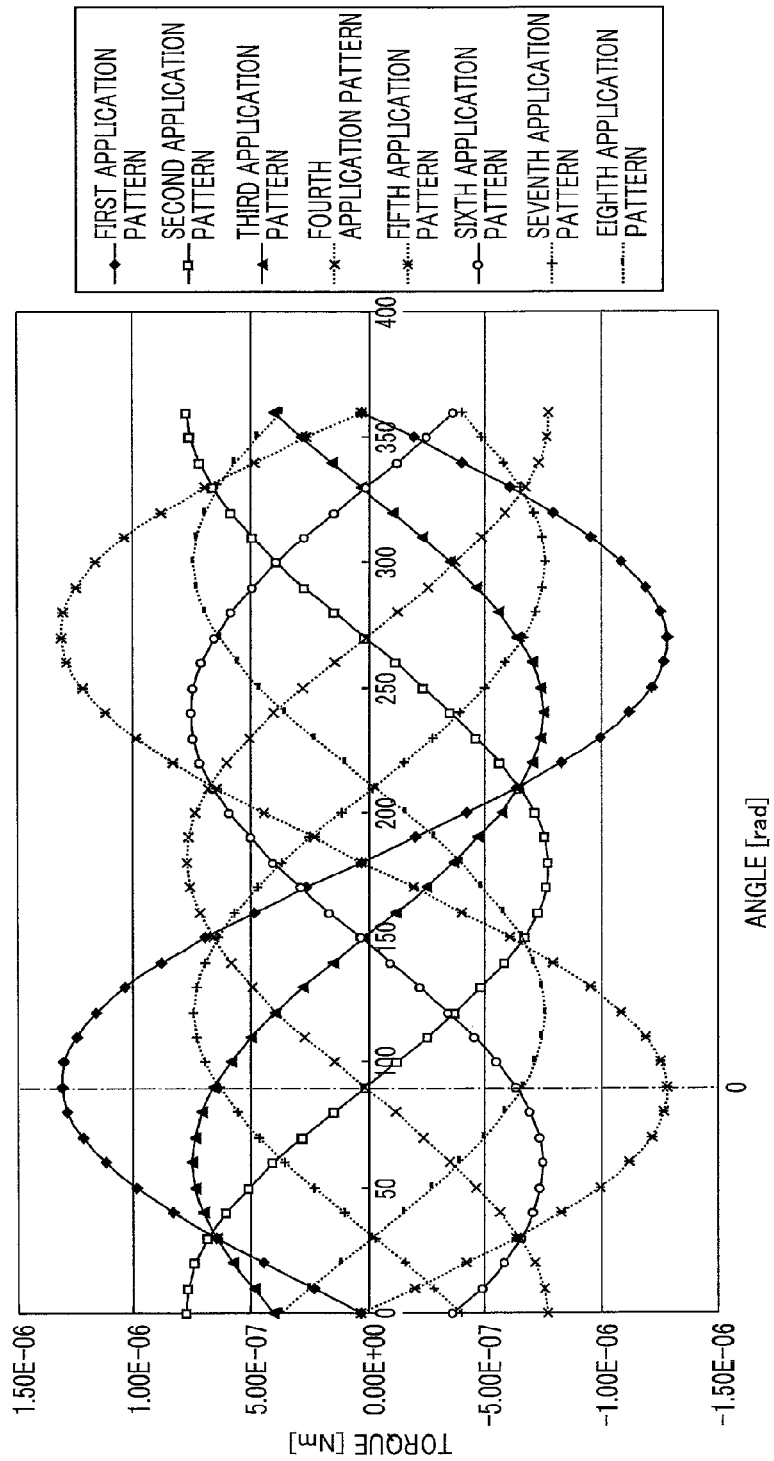

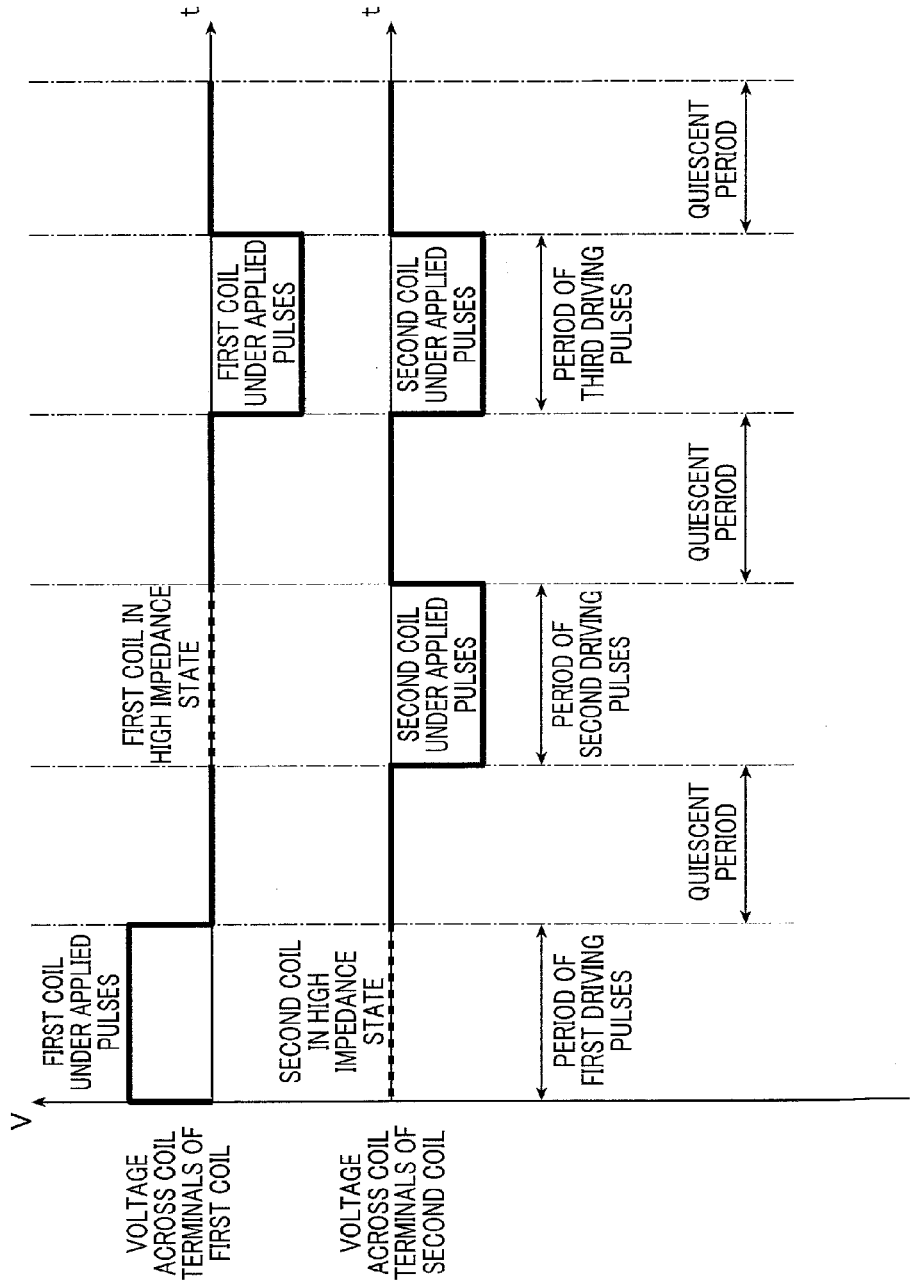

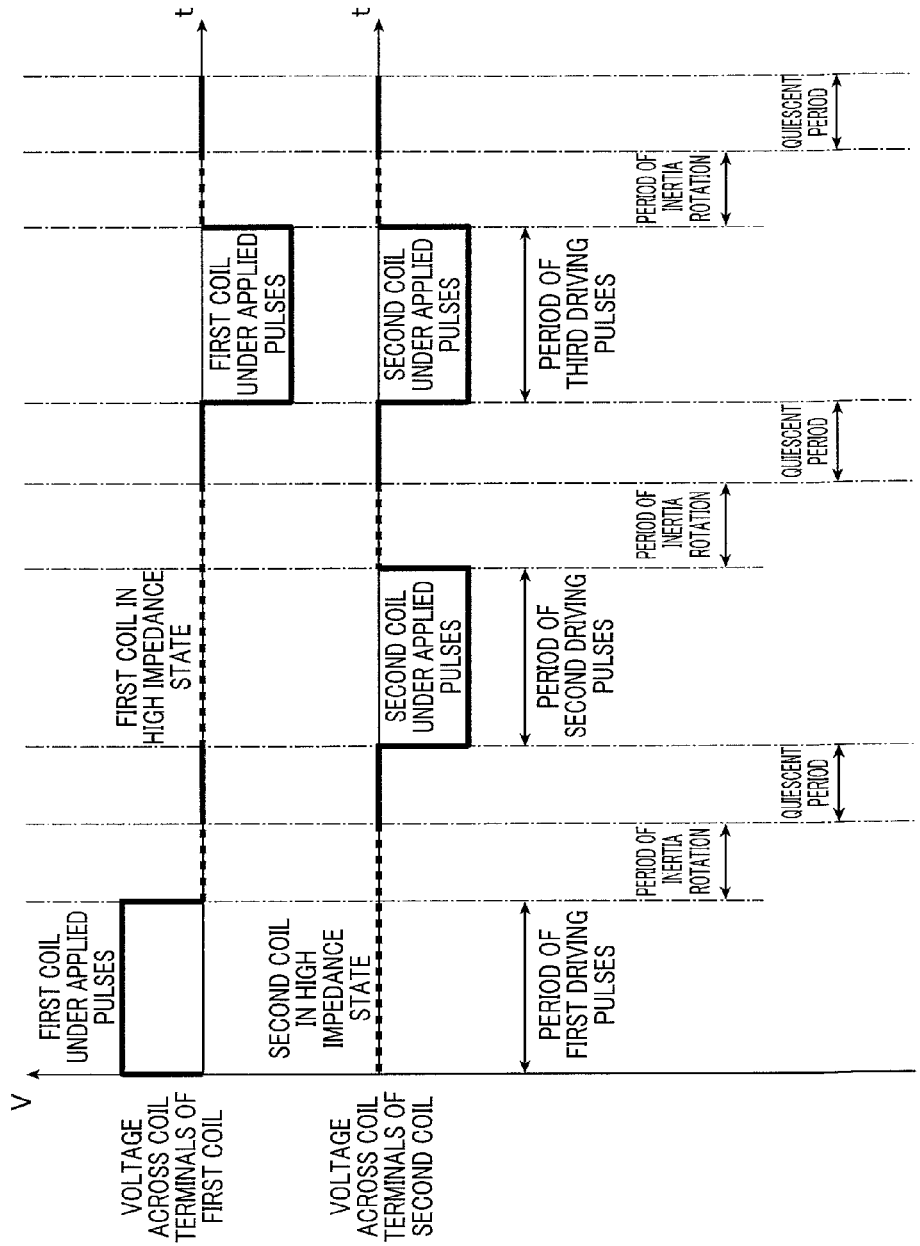

US 9,537,435 B2

STEPPING MOTOR AND TIMEPIECE PROVIDED WITH STEPPING MOTOR

BACKGROUND OF THE INVENTION

1. Field of the Invention

The present invention relates to a stepping motor and a timepiece provided with the stepping motor.

2. Description of Related Art

A typical conventional stepping motor includes two coils and can rotate in both the normal and reverse directions under appropriate driving pulses applied to the coils.

For example, JP Hei05-006440 discloses a stepping motor including a bipolarly-magnetized round rotor magnet and a stator having two primary poles and a single secondary pole.

Unfortunately, the two coils of the conventional stepping motor are connected to a circuit all the time, resulting in a constant electrical loop between the coils.

When driving pulses are applied to one of the coils, the inductance occurs in the other coil in response to the rotation of the rotor. Such inductance obstructs the rotation of the rotor.

In other words, if driving pulses are applied to one of the coils alone, the reactance occurring in the other coil in response to the rotation of the rotor driven by the one coil obstructs the rotation of the rotor.

The reactance consumes the power supplied for rotating the rotor, so that the rotation of the rotor requires an additional amount of energy.

SUMMARY OF THE INVENTION

An object of the invention, which has been accomplished on the above background, is to provide a power-saving stepping motor that includes multiple coils and can reduce the loss in the energy supplied for rotating a rotor, the stepping motor rotating the rotor by a predetermined step angle under appropriate driving pulses applied to the coils; and a timepiece including the stepping motor.

In order to achieve the above object, one aspect of the present invention is a stepping motor including a rotor, a plurality of coils and a switching mechanism, and the stepping motor simultaneously or sequentially applies driving pulses to the coils to rotate the rotor by a predetermined step angle, and while the driving pulses are being applied to part of the coils, the switching mechanism switches the rest of the coils other than the part of the coils driven by the driving pulses into a high impedance state.

Another aspect of the present invention is a timepiece including a stepping motor provided with a stator including a stator body and coils, rotor stoppers each of which provided every predetermined rotation angle, the predetermined rotation angle being smaller that an angle obtained by dividing one rotation by a product of M which is an even number referring to a number of magnetization in the rotor and N which is a number referring to a number of magnetic poles in the stator, a driving pulse supplying circuit which applies driving pulses to the coils to rotate the rotor by the predetermined rotation angle and a controller which controls the driving pulse supplying circuit, and hands and a gear train mechanism which is coupled with the hands and which is driven in response to rotation of the stepping motor, and the stator body includes a rotor which includes a cylindrical rotor magnet having an even number of magnetization in a radial direction and a rotor accommodating space which accommodates the rotor, the stator body having an odd number of magnetic poles along a periphery of the rotor, and the coils are magnetically connected with the stator body.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4A corresponding to FIG. 3A, FIG. 4B corresponding to FIG. 3B, and FIG. 4C corresponding to FIG. 3C;

FIG. 5 is a timing chart illustrating voltage across the terminals of each coil if driving pulses are continuously applied to the stepping motor in FIG. 1 to rotate the rotor by 180°;

FIG. 6 is a timing chart illustrating voltage across the terminals of each coil if driving pulses are intermittently applied to the stepping motor in FIG. 1 to rotate the rotor by 180°;

FIG. 7 is a graph illustrating torque for several patterns of applied driving pulses;

FIG. 9A illustrating the operation during application of first driving pulses, FIG. 9B illustrating the operation during application of second driving pulses, and FIG. 9C illustrating the operation during application of third driving pulses;

FIG. 10 is a timing chart illustrating voltage across the terminals of each coil if driving pulses are substantially continuously applied to the stepping motor in FIG. 8 to rotate the rotor by 60°;

FIG. 11 is a timing chart illustrating voltage across the terminals of each coil if driving pulses are intermittently applied to the stepping motor in FIG. 8 to rotate the rotor by 60°;

FIG. 12A illustrating current flows during application of first driving pulses, FIG. 12B illustrating current flows during application of second driving pulses, and FIG. 12C illustrating current flows during application of third driving pulses.

DESCRIPTION OF THE PREFERRED EMBODIMENTS

First Embodiment

The stepping motor according to a first embodiment of the present invention will now be described with reference to FIGS. 1 to 7.

The stepping motor according to the embodiment is a compact motor, for example, used for rotation of a hand driving mechanism for driving hands or a date indicating mechanism in a watch. The stepping motor according to the present invention is also applicable to any field other than this example.

Figure 1:
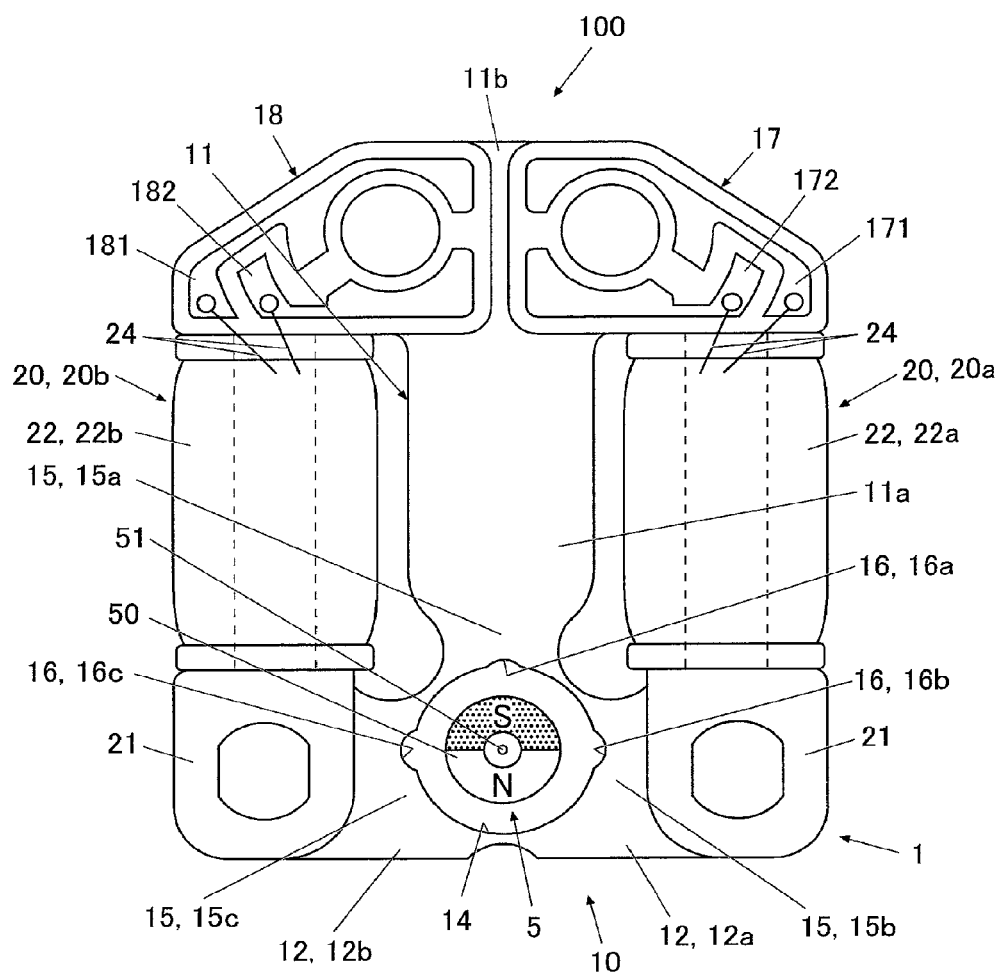
FIG. 1 is a plane view of a stepping motor including a rotor disposed at the position of 0° according to a first embodiment.

FIG. 1 is a plan view of the stepping motor according to the embodiment.

With reference to FIG. 1, a stepping motor 100 includes a stator 1 and a rotor 5.

The rotor 5 includes a rotor magnet 50 that is bipolarly-magnetized in the radial direction and is attached to a rotary shaft 51. According to the embodiment, the rotor magnet 50 has a disk shape and the rotary shaft 51 extends through the center of the rotor magnet 50.

Although the rotor magnet 50 should preferably be a permanent magnet, such as a rare-earth magnet (e.g., samarium-cobalt magnet), the rotor magnet 50 may be any other magnet.

The rotor 5 is accommodated in a rotor accommodating space 14 of a stator body 10 (described below) such that the rotor 5 is rotatable about the rotary shaft 51. According to the embodiment, under driving pulses simultaneously or sequentially applied to two coils (first coil 22a and second coil 22b; described below), the rotor 5 can rotate in both the normal direction (clockwise direction) and the reverse direction (counterclockwise direction) by a predetermined step angle inside the rotor accommodating space 14.

The rotary shaft 51 is coupled to, for example, gears (not shown) constituting a gear train mechanism for driving hands of a timepiece, such that the gears rotate with the rotor 5.

According to the embodiment, the stator 1 includes a stator body 10 and two coil blocks 20 (first coil block 20a and second coil block 20b). The collective name "coil blocks 20" hereinafter indicates both the first coil block 20a and the second coil block 20b.

The stator body 10 includes a substantially T-shaped center yoke 11 having a narrow straight portion 11a and a substantially symmetrical extension 11b extending orthogonally from an end of the narrow straight portion 11a, and a pair of side yokes 12 (12a and 12b) substantially symmetrically disposed to the other end of the narrow straight portion 11a of the center yoke 11. The stator body 10 has a substantially anchor-shaped outline.

The stator body 10 is composed of a highly magnetically permeable material, such as a permalloy.

The stator body 10 has a substantially circular rotor accommodating space 14 to accommodate the rotor 5 at the intersection of the center yoke 11 with the side yokes 12a and 12b.

In an excited state, the stator body 10 has three magnetic poles 15, i.e., a first magnetic pole 15a, a second magnetic pole 15b and a third magnetic pole 15c along the periphery of the rotor magnet 50 of the rotor 5 accommodated in the rotor accommodating space 14.

In the magnetic poles 15 around the rotor accommodating space 14, the first magnetic pole 15a appears in the center yoke 11, the second magnetic pole 15b appears in the side yoke 12a, and the third magnetic pole 15c appears in the side yoke 12b, according to the embodiment.

The polarity (south pole or north pole) of each of the three magnetic poles 15 (first magnetic pole 15a, second magnetic pole 15b, and third magnetic pole 15c) of the stator 1 is switched in response to driving pulses applied to two coils 22 (described below) of the coil blocks 20.

The first coil block 20a (described below) is magnetically connected to the extension 11b of the center yoke 11 of the stator body 10 at one end, and is magnetically connected to the free end of the side yoke 12a of the stator body 10 at the other end. The second coil block 20b is magnetically connected to the extension 11b of the center yoke 11 of the stator body 10 at one end, and is magnetically connected to the free end of the side yoke 12b of the stator body 10 at the other end.

According to the embodiment, driving pulses are applied to the two coils 22 (first coil 22a and second coil 22b) of the coil blocks 20 under the control of a controller 31 (described below), to generate magnetic fluxes from the coils 22. The magnetic fluxes flow through magnetic cores 21 of the coil blocks 20 and the stator body 10 magnetically connected to the magnetic cores 21, to appropriately switch the polarity (south pole or north pole) of each of the three magnetic poles 15 (first magnetic pole 15a, second magnetic pole 15b, and third magnetic pole 15c).

The stator 1 further includes stator-side stoppers to maintain the static state of the rotor 5. The stator-side stoppers according to the embodiment are defined by three notches 16 (notches 16a to 16c) provided on the inner periphery of the stator 1 around the rotor accommodating space 14.

In specific, the notch 16a is provided at the top of the first magnetic pole 15a of the stator body 10 on the inner periphery of the stator 1 around the rotor accommodating space 14, the top facing the rotor magnet 50. The positions of the notches 16b and 16c are determined on the line extending through the center of the rotor magnet 50 orthogonally to the line connecting the poles of the rotor magnet 50 (i.e., the line connecting pole boundary positions or the ends of the boundary between the poles of the rotor magnet 50), while the notch 16a faces either one of the poles of the rotor magnet 50.

The stepping motor 100 according to the embodiment has the highest index torque (holding torque) when the notches 16b and 16c respectively face the pole boundary positions of the rotor magnet 50. Under no applied driving pulses in a non-energized state, the rotor 5 stops at a magnetically stable position where the notches 16b and 16c respectively face the pole boundary positions of the rotor magnet 50 as illustrated in FIG. 1.

The coil blocks 20 (first coil block 20a and second coil block 20b) each include a magnetic core 21 composed of a highly magnetically permeable material, such as a permalloy, and a coil 22 (first coil 22a or second coil 22b) composed of a wire winding around the magnetic core 21. According to the embodiment, the first coil 22a and the second coil 22b are the same in the diameter of the wire, the number of winding turns, and the direction of winding. The collective name "coils 22" hereinafter indicates both the first coil 22a and the second coil 22b.

The first coil block 20a is magnetically connected to the extension 11b of the center yoke 11 of the stator body 10 with screws at the magnetic core 21 in one end, and is magnetically connected to the free end of the side yoke 12a of the stator body 10 with screws at the other end. The second coil block 20b is magnetically connected to the extension 11b of the center yoke 11 of the stator body 10 with screws at the magnetic core 21 in one end, and is magnetically connected to the free end of the side yoke 12b of the stator body 10 with screws at the other end.

The stator body 10 may be magnetically connected to the first coil block 20a or the second coil block 20b by any means other than the screws. For example, the stator body 10 may be fixed to the first coil block 20a or the second coil block 20b by welding.

The screws for connecting the stator body 10 to the coil blocks 20 may fix the stepping motor 100 inside a device or on a substrate (which are not shown).

The extension 11b of the center yoke 11, which is connected to one ends of the magnetic cores 21 of the coil blocks 20, is covered with a pair of substrates 17 and 18. The substrates 17 and 18 are fastened onto the stator 1 with the screws connecting the stator body 10 to the coil blocks 20. It is noted that the two separated substrates 17 and 18 may be a single integrated substrate.

Figure 2:
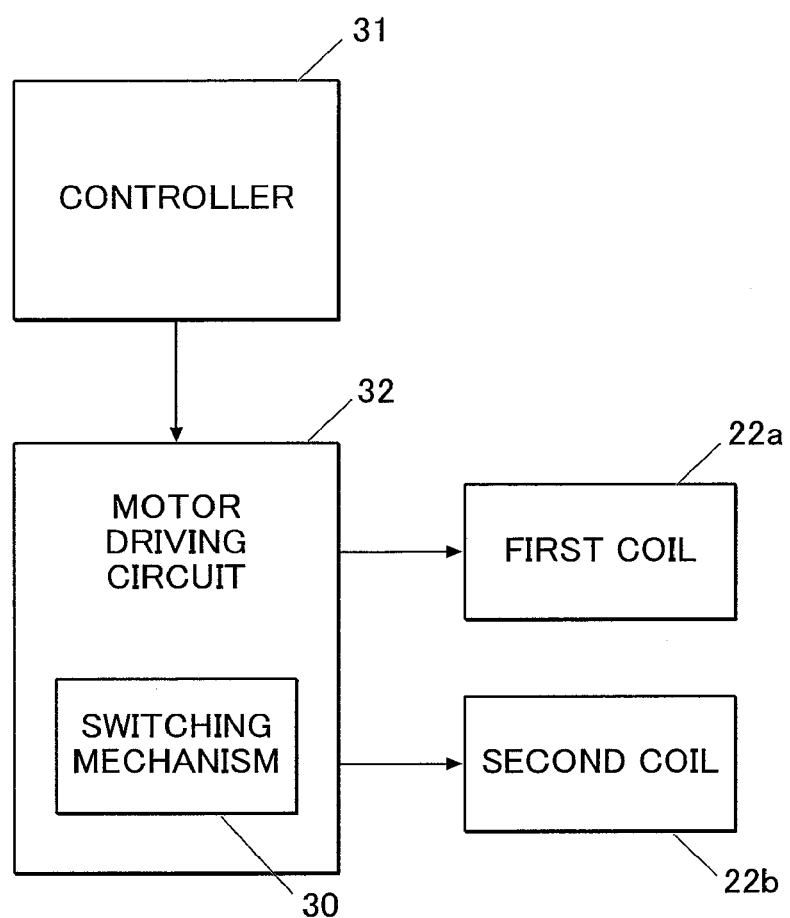
FIG. 2 is a block diagram illustrating the main configuration of the stepping motor in FIG. 1.

The substrate 17 is provided with a first coil terminal 171 and a second coil terminal 172 of the first coil block 20a thereon. Wire ends 24 and 24 of the first coil 22a are respectively connected to the first coil terminal 171 and the second coil terminal 172 on the substrate 17. With reference to FIG. 2, the first coil 22a is connected to a motor driving circuit 32 (described below) through the first coil terminal 171 and the second coil terminal 172.

The substrate 18 is provided with a first coil terminal 181 and a second coil terminal 182 of the second coil block 20b thereon. Wire ends 24 and 24 of the second coil 22b are respectively connected to the first coil terminal 181 and the second coil terminal 182 on the substrate 18. With reference to FIG. 2, the second coil 22b is connected to the motor driving circuit 32 through the first coil terminal 181 and the second coil terminal 182.

FIGS. 3A to 3D are circuit diagrams illustrating an example motor driving circuit for driving the stepping motor 100 according to the embodiment.

The motor driving circuit 32 simultaneously or sequentially applies driving pulses to the two coils 22. With reference to FIGS. 3A to 3D, the motor driving circuit 32 is an H-bridge circuit including switching elements (field effect transistors (FETs) in the embodiment) 32a to 32f in an H-bridge arrangement.

According to the embodiment, the motor driving circuit 32 includes a circuit portion for the first coil 22a and a circuit portion for the second coil 22b. The circuit portions are connected in parallel to each other while sharing the switching elements 32a and 32b.

In specific, in the motor driving circuit 32, the switching element 32a is connected between the power source V and the first coil terminal 171 of the first coil 22a or the first coil terminal 181 of the second coil 22b, while the switching element 32b is connected between the ground GND and the first coil terminal 171 of the first coil 22a or the first coil terminal 181 of the second coil 22b.

The switching element 32c is connected between the power source V and the second coil terminal 172 of the first coil 22a, while the switching element 32d is connected between the ground GND and the second coil terminal 172 of the first coil 22a, in the motor driving circuit 32.

The switching element 32e is connected between the power source V and the second coil terminal 182 of the second coil 22b, while the switching element 32f is connected between the ground GND and the second coil terminal 182 of the second coil 22b, in the motor driving circuit 32.

The motor driving circuit 32 may have any configuration other than the above example. For example, the motor driving circuit 32 may include two parallel H-bridge motor driving circuits each including four switching elements corresponding to each of the two coils 22.

With reference to FIG. 2, the motor driving circuit 32 includes a switching mechanism 30 to switch one of the two coils 22 into a high impedance state while driving pulses are being applied to the other coil 22 alone.

The switching mechanism 30 according to the embodiment is composed of the switching elements 32a to 32f.

The controller 31 controls the motor driving circuit 32 to simultaneously or sequentially apply driving pulses to the first coil 22a and the second coil 22b. In specific, the controller 31 switches the ON/OFF states of the switching elements 32a to 32f of the motor driving circuit 32, such that driving pulses are appropriately applied to the first coil 22a and the second coil 22b.

According to the embodiment, the controller 31 controls the motor driving circuit 32 to continuously apply three types of driving pulses such that the rotor 5 rotates 180°, as will be explained later.

According to the embodiment, the controller 31 controls the switching mechanism 30 to switch one of the two coils 22 into a high impedance state while driving pulses are being applied to the other coil 22 alone.

The controller 31 may have any configuration, and typically includes a large scale integration (LSI) circuit, for example.

An exemplary control of the controller 31 for switching the ON/OFF states of the switching elements 32a to 32f to rotate the rotor 5 will now be explained with reference to FIGS. 3A to 3D, 4A to 4C, and 5.

Figure 3A:
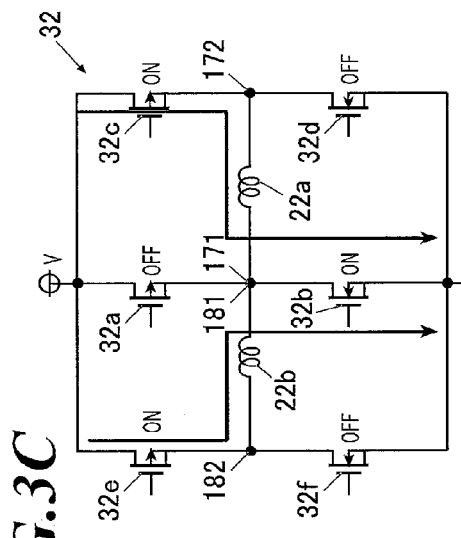
FIGS. 3A to 3D are circuit diagrams illustrating current flows through the stepping motor in FIG. 1 wherein FIG. 3A illustrating a current flow during application of first driving pulses, FIG. 3B illustrating a current flow during application of second driving pulses, FIG. 3C illustrating current flows during application of third driving pulses, and FIG. 3D illustrating a state after application of the third driving pulses.
Figure 3B:
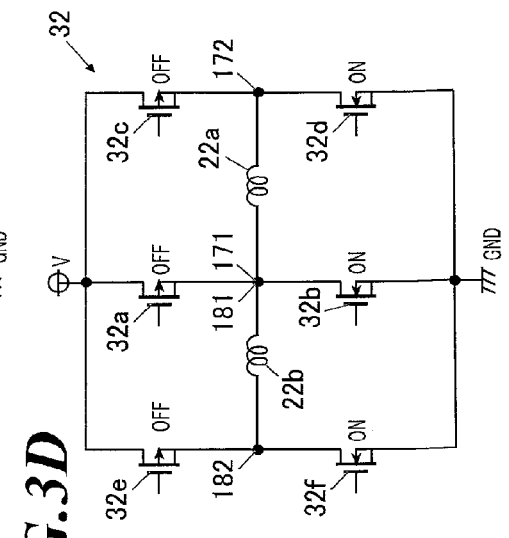
Figure 3C:
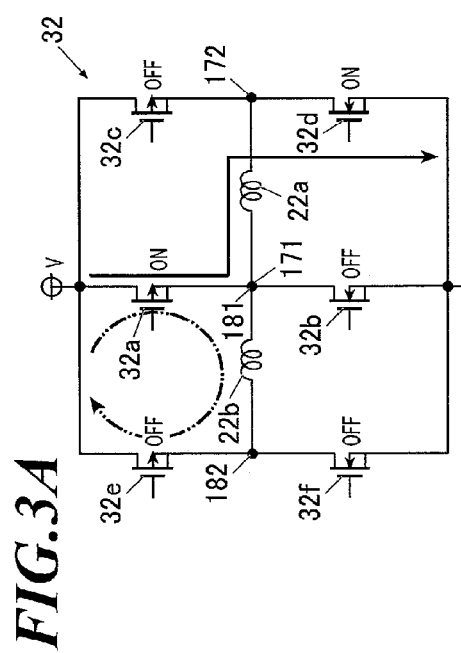
Figure 4A:
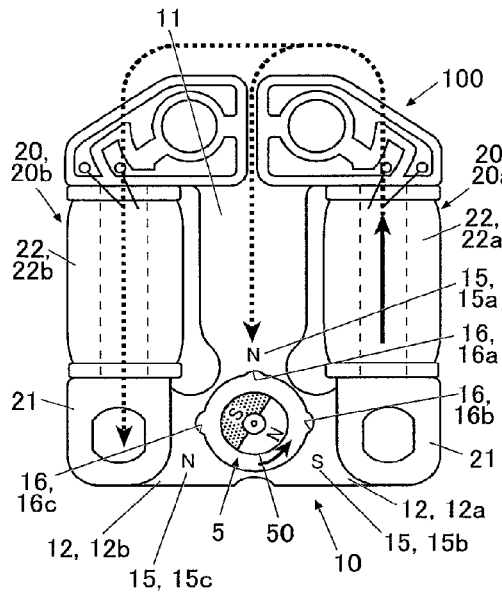
FIGS. 4A to 4C are plan views illustrating the operation of the stepping motor in FIG. 1.
Figure 4C:
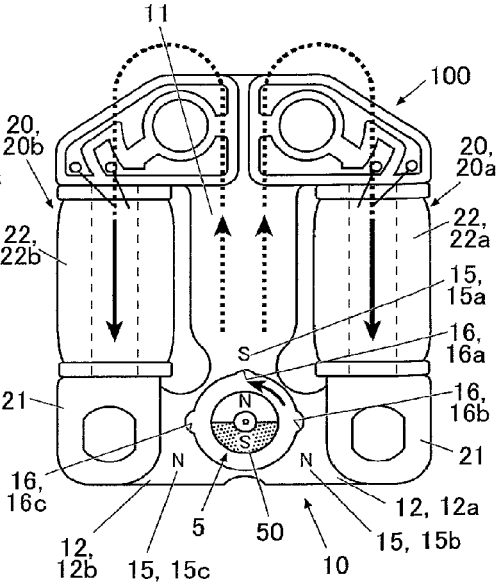
Figure 4B:
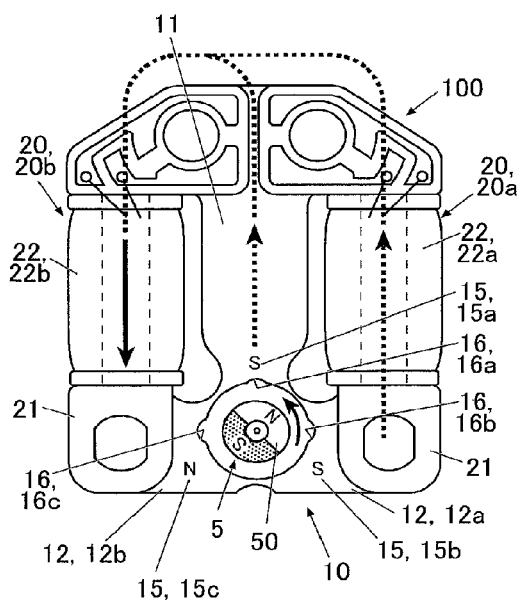

FIGS. 4A to 4C illustrate flows of magnetic fluxes from the rotor 5 rotating in the reverse direction (counterclockwise direction). The solid arrows in FIGS. 3A to 3C respectively indicate current flows in the situations of FIGS. 4A to 4C.

In FIGS. 4A to 4C, the rotor 5 rotates counterclockwise from the initial position (position of 0°) where the south pole of the rotor magnet 50 is closest to the first magnetic pole 15a (as illustrated in FIG. 1). In FIGS. 4A to 4C, the solid arrows indicate the directions of the magnetic fluxes generated from the coils 22, while the broken arrows indicate the flows of the magnetic fluxes through the stator 1.

In the magnetically stable initial state where the south pole of the rotor magnet 50 is closest to the first magnetic pole 15a (as illustrated in FIG. 1), the first magnetic pole 15a facing the south pole of the rotor magnet 50 is the north pole whereas the other two magnetic poles (second magnetic pole 15b and third magnetic pole 15c) are the south poles. In order to rotate the rotor 5 from the initial state (initial position) in the reverse direction (counterclockwise direction), as illustrated in FIG. 3A, the controller 31 turns on the switching elements 32a and 32d such that first driving pulses are applied to the first coil 22a (during the "period of first driving pulses" in FIG. 5). This control causes a current flow as illustrated with the solid arrow in FIG. 3A. With reference to FIG. 4A, the magnetic flux having a direction illustrated with the solid arrow is generated from the first coil 22a, and flows through the stator body 10 and the magnetic cores 21 as illustrated with the broken arrows, to reverse the third magnetic pole 15c into the north pole. The north pole of the rotor magnet 50 repels the third magnetic pole 15c and is attracted by the second magnetic pole 15*b*, so that the rotor 5 starts rotating in the reverse direction.

With reference to FIG. 3B, the controller 31 then turns on the switching elements 32*b* and 32*e* to apply second driving pulses to the second coil 22*b* (during the "period of second driving pulses" in FIG. 5). This control causes a current flow as illustrated with the solid arrow in FIG. 3B. With reference to FIG. 4B, the magnetic flux having a direction illustrated with the solid arrow is generated from the second coil 22*b*, and flows through the stator body 10 and the magnetic cores 21 as illustrated with the broken arrows, to reverse the first magnetic pole 15*a* into the south pole. The north pole of the rotor magnet 50 is attracted by the first magnetic pole 15*a*, so that the rotor 5 further rotates in the reverse direction.

With reference to FIG. 3C, the controller 31 turns on the switching elements 32*b*, 32*c*, and 32*e* to apply third driving pulses to the coils 22*a* and 22*b* (during the "period of third driving pulses" in FIG. 5). This control causes current flow as illustrated with the solid arrows in FIG. 3C. With reference to FIG. 4C, the magnetic fluxes having directions illustrated with the solid arrows are generated from the first coil 22*a* and the second coil 22*b*, and flow through the stator body 10 and the magnetic cores 21 as illustrated with the broken arrows, to reverse the second magnetic pole 15*b* into the north pole. The north pole of the rotor magnet 50 repels the second magnetic pole 15*b* and is attracted by the first magnetic pole 15*a*, so that the rotor 5 further rotates in the reverse direction. The rotor 5 stops its rotation at a magnetically stable position where the pole boundary positions of the rotor magnet 50 respectively face the notches 16*b* and 16*c* (i.e., the position rotated −180° from the initial position).

With reference to FIG. 5, the controller 31 applies the first driving pulses to the first coil 22*a*, applies the second driving pulses to the second coil 22*b*, and applies the third driving pulses to the coils 22*a* and 22*b*, with no interval between the applications. The controller 31 can thus control the rotor 5 to smoothly rotate 180° (−180°) through the continuous application of the three types of driving pulses.

When the three types of driving pulses (having voltages of the opposite sign) are further sequentially applied, the rotor 5 further rotates −180° to return to the initial state (initial position).

With reference to FIG. 6, the controller 31 may control the first coil 22*a* and the second coil 22*b* to be in a high impedance state during a period of inertia rotation after every application of the first, second, or third driving pulses. The period of inertia rotation after every application of the driving pulses allows the controller 31 to control the rotor 5 to smoothly rotate 180° (−180°) with low power consumption.

The rotor 5 can also rotate in the normal direction from the initial state (initial position) illustrated in FIG. 1, although this operation is not illustrated in the drawings. At this time, the controller 31 turns on the switching elements 32*a* and 32*f* to apply the first driving pulses. The controller 31 then turns on the switching elements 32*b* and 32*c* to apply the second driving pulses. The controller 31 then turns on the switching elements 32*b*, 32*c*, and 32*e* to apply the third driving pulses. The rotor 5 stops its rotation at a magnetically stable position where the pole boundary positions of the rotor magnet 50 respectively face the notches 16*b* and 16*c* (i.e., the position rotated 180° from the initial position), just like the case of the reverse rotation of the rotor 5.

If the three types of driving pulses (having voltages of the opposite sign) are further sequentially applied, the rotor 5 further rotates 180° to return to the initial state (initial position), just like the case of the reverse rotation of the rotor 5.

An exemplary control of the controller 31 for switching the ON/OFF states of the switching elements 32*a* to 32*f* constituting the switching mechanism 30 to control one of the coils 22 to be in a high impedance state while driving pulses are being applied to the other coil 22 alone, will now be explained with reference to FIGS. 3A to 3D.

With reference to FIG. 3A, while driving pulses are being applied to the first coil 22*a* alone, the controller 31 turns off the switching element 32*e* (switching mechanism 30) connected between the power source V and the second coil terminal 182 of the second coil 22*b*.

The switching element 32*e* connected between the power source V and the second coil terminal 182 of the second coil 22*b* and the switching element 32*f* connected between the ground GND and the second coil terminal 182 are both turned off. This control breaks the current path to the second coil 22*b* (i.e., substantially isolates the second coil 22*b* from the motor driving circuit 32), to switch the second coil 22*b* into a high impedance state.

With reference to FIG. 3B, while driving pulses are being applied to the second coil 22*b* alone, the controller 31 turns off the switching element 32*d* (switching mechanism 30) connected between the ground GND and the second coil terminal 172 of the first coil 22*a*.

The switching element 32*c* connected between the power source V and the second coil terminal 172 of the first coil 22*a* and the switching element 32*d* connected between the ground GND and the second coil terminal 172 are both turned off. This control breaks the current path to the first coil 22*a* (i.e., substantially isolates the first coil 22*a* from the motor driving circuit 32), to switch the first coil 22*a* into a high impedance state.

With reference to FIG. 3C, while driving pulses are being applied to both the first coil 22*a* and the second coil 22*b*, the controller 31 controls neither of the coils 22 to be in a high impedance state.

Figure 3D:
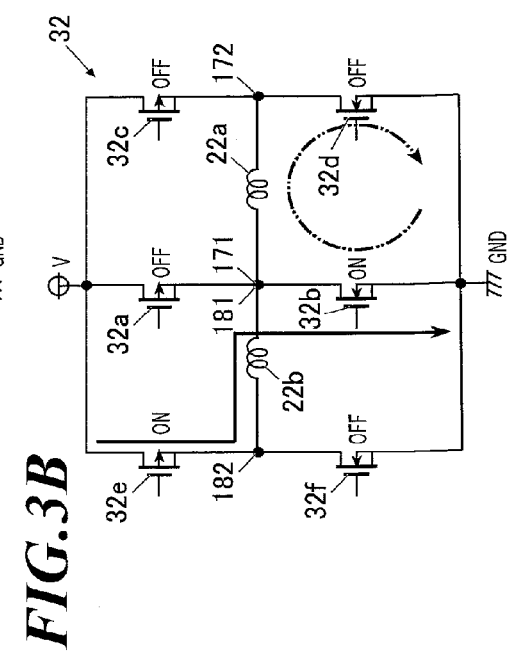

After the application of the driving pulses as illustrated in FIG. 3C, the controller 31 turns off the switching element 32*a* (switching mechanism 30) connected between the power source V and the first coil terminal 171 of the first coil 22*a* or the first coil terminal 181 of the second coil 22*b*, the switching element 32*c* (switching mechanism 30) connected between the power source V and the second coil terminal 172 of the first coil 22*a*, and the switching element 32*e* (switching mechanism 30) connected between the power source V and the second coil terminal 182 of the second coil 22*b*, as illustrated in FIG. 3D.

Figure 12C:
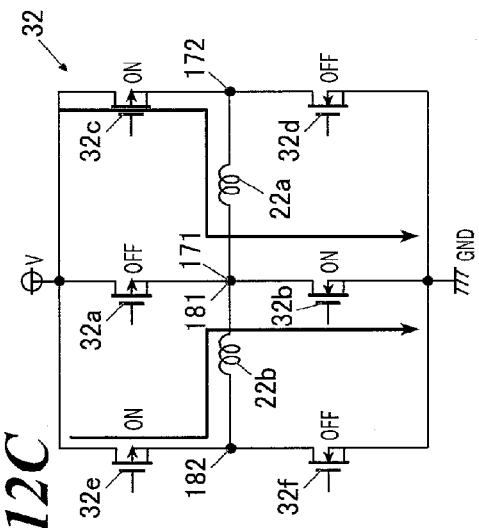
FIGS. 12A to 12C are circuit diagrams illustrating current flows through a conventional stepping motor.
Figure 12A:
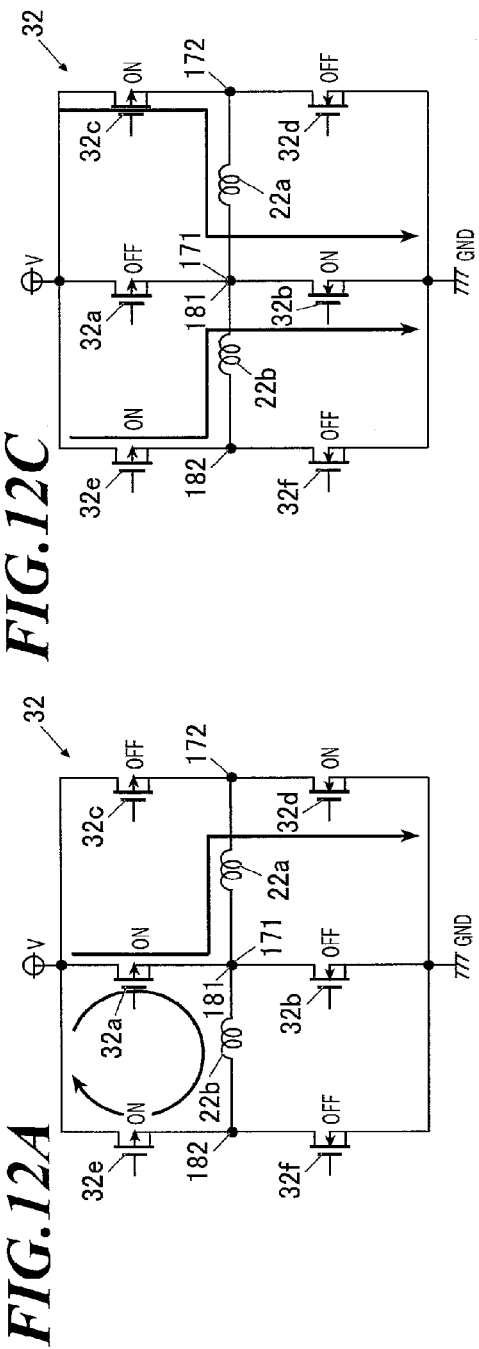
Figure 12B:
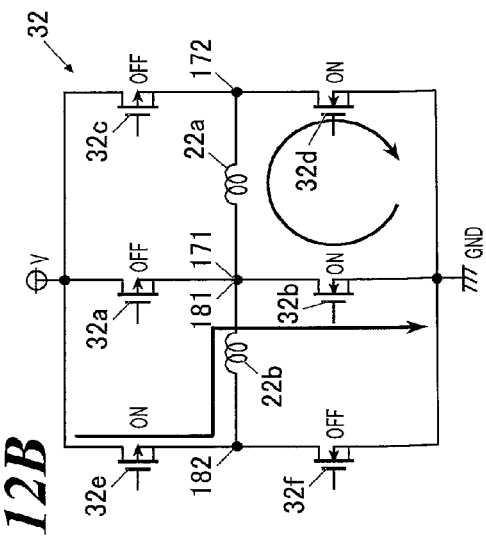

With reference to FIGS. 12A to 12C, if one of the coils 22 was not in a high impedance state during the application of driving pulses to the other coil 22 alone, the reactance would occur in the one coil 22 receiving no driving pulse, in response to the rotation of the rotor 5 driven by the driving pulses applied to the other coil 22. Such reactance obstructs the rotation of the rotor 5 and consumes the power required for rotating the rotor 5.

In contrast, if the controller 31 controls the switching mechanism 30 to switch the one coil 22 (second coil 22*b* in the embodiment) receiving no driving pulse into a high impedance state, no reactance occurs in the one coil 22 (second coil 22*b* in the embodiment) in response to the rotation of the rotor 5 driven by the driving pulses applied to the other coil 22 (first coil 22*a* in the embodiment). This configuration allows the rotor 5 to rotate at high speed with reduced power.

The driving pulses for rotating the rotor 5 by 180° (−180°) may be applied in any pattern other than that illustrated in FIGS. 3A to 3D and 4A to 4C.

In order to rotate the bipolarly-magnetized rotor 5, the torque required for the rotation should be generated by the driving pulses applied to one or both of the coils 22. The application of driving pulses can be varied into eight application patterns through the selection of the application or non-application of driving pulses to each coil 22 and the selection of positive or negative driving pulses if they are to be applied.

FIG. 7 is a graph illustrating torque generated by each of the eight application patterns.

In FIG. 7, the first application pattern involves the application of driving pulses at 1.0 mA to both the first coil 22a and the second coil 22b, the second application pattern involves the application of driving pulses at 1.0 mA to the first coil 22a and driving pulses at −1.0 mA to the second coil 22b, the third application pattern involves the application of driving pulses at 1.0 mA to the first coil 22a alone, the fourth application pattern involves the application of driving pulses at −1.0 mA to the first coil 22a and driving pulses at 1.0 mA to the second coil 22b, the fifth application pattern involves the application of driving pulses at −1.0 mA to both the first coil 22a and the second coil 22b, the sixth application pattern involves the application of driving pulses at −1.0 mA to the first coil 22a alone, the seventh application pattern involves the application of driving pulses at 1.0 mA to the second coil 22b alone, and the eighth application pattern involves the application of driving pulses at −1.0 mA to the second coil 22b alone.

With reference to FIG. 7, the magnitude and direction of the torque vary depending on the angle of the rotor 5 in each pattern of driving pulses applied to the coils 22; hence, the patterns are appropriately combined in order to rotate the rotor 5 by any target angle.

In general, the rotation of the rotor 5 by 180° (−180°) is achieved by a combination of three specified patterns of driving pulses applied to the coils 22. According to the embodiment, driving pulses are applied to either one of the coils 22 alone during the "period of first driving pulses" and "period of second driving pulses," and are applied to both coils 22 during the "period of third driving pulses," as is explained above.

It is noted that the rotor 5 can be rotated by a predetermined step angle, such as 180° (−180°), with only driving pulses applied to either one of the coils 22 alone (i.e., a combination of the third, sixth, seventh, and eighth application patterns in FIG. 7). In this case, the other coil 22 receiving no driving pulse can maintain the high impedance state during all of the "period of first driving pulses," "period of second driving pulses," and "period of third driving pulses."

For example, after the 180° rotation of the rotor 5 in the normal direction (clockwise direction) driven by the positive driving pulses applied to the first coil 22a alone in the third application pattern, the negative driving pulses applied to the first coil 22a alone in the sixth application pattern can further rotate the rotor 5 by 180° in the normal direction. Through the repetition of the third and sixth application patterns involving the application of driving pulses to the first coil 22a alone, the rotor 5 can continuously rotate by 180° in the normal direction (clockwise direction). The second coil 22b can thus maintain the high impedance state all the time during the normal rotation of the rotor 5.

In another example, after the −180° rotation of the rotor 5 in the reverse direction (counterclockwise direction) driven by the positive driving pulses applied to the second coil 22b alone in the seventh application pattern, the negative driving pulses applied to the second coil 22b alone in the eighth application pattern can further rotate the rotor 5 by −180° in the reverse direction. Through the repetition of the seventh and eighth application patterns involving the application of driving pulses to the second coil 22b alone, the rotor 5 can continuously rotate by −180° in the reverse direction (counterclockwise direction). The first coil 22a can thus maintain the high impedance state all the time during the reverse rotation of the rotor 5.

The selection of a combination of the application patterns can reduce the loss in power and time for appropriately switching one of the coils 22 into a high impedance state, leading to further energy saving.

The operation of the stepping motor 100 according to the embodiment will now be explained with reference to FIGS. 3A to 3D and 4A to 4C. The following explanation focuses on an example involving three types of driving pulses simultaneously or sequentially applied to the two coils 22 for rotation of the rotor 5 by a predetermined step angle (−180° in the embodiment) in the counterclockwise direction (reverse direction).

With reference to FIG. 3A, the controller 31 turns on the switching element 32a connected between the power source V and the first coil terminal 171 of the first coil 22a and the switching element 32d connected between the ground GND and the second coil terminal 172 of the first coil 22a; and turns off or maintains the OFF states of the switching element 32c connected between the power source V and the second coil terminal 172 of the first coil 22a, the switching element 32e connected between the power source V and the second coil terminal 182 of the second coil 22b, the switching element 32b connected between the ground GND and the first coil terminal 181 of the second coil 22b, and the switching element 32f connected between the ground GND and the second coil terminal 182 of the second coil 22b. In such a state, the controller 31 applies the first driving pulses to the first coil 22a. This control initiates the counterclockwise rotation of the rotor 5, as illustrated in FIG. 4A. The second coil 22b in a high impedance state generates no reactance, and thus does not obstruct the rotation of the rotor 5 driven by the first coil 22a.

With reference to FIG. 3B, the controller 31 then turns on the switching element 32e connected between the power source V and the second coil terminal 182 of the second coil 22b and the switching element 32b connected between the ground GND and the first coil terminal 181 of the second coil 22b; and turns off or maintains the OFF states of the switching element 32a connected between the power source V and the first coil terminal 171 of the first coil 22a, the switching element 32c connected between the power source V and the second coil terminal 172 of the first coil 22a, the switching element 32d connected between the ground GND and the second coil terminal 172 of the first coil 22a, and the switching element 32f connected between the ground GND and the second coil terminal 182 of the second coil 22b. In such a state, the controller 31 applies the second driving pulses to the second coil 22b. This control further rotates the rotor 5 counterclockwise, as illustrated in FIG. 4B. The first coil 22a in a high impedance state generates no reactance, and thus does not obstruct the rotation of the rotor 5 driven by the second coil 22b.

With reference to FIG. 3C, the controller 31 then turns on the switching element 32c connected between the power source V and the second coil terminal 172 of the first coil 22a, the switching element 32e connected between the power source V and the second coil terminal 182 of the second coil 22b, and the switching element 32b connected between the ground GND and the first coil terminal 171 or 181 of the first or second coil 22a or 22b; and turns off or maintains the OFF states of the switching element 32a connected between the power source V and the first coil terminal 171 or 181 of the first or second coil 22a or 22b, the switching element 32d connected between the ground GND and the second coil terminal 172 of the first coil 22a, and the switching element 32f connected between the ground GND and the second coil terminal 182 of the second coil 22b. In such a state, the controller 31 applies the third driving pulses to both the first coil 22a and the second coil 22b. This control completes the counterclockwise rotation of the rotor 5 by −180°, as illustrated in FIG. 4C.

In the stepping motor 100 including the two coils 22 according to the embodiment, while driving pulses are being applied to one of the coils (e.g., the first coil 22a) alone, another coil (e.g., the second coil 22b), other than the coil (e.g., the first coil 22a) driven by the driving pulses, is switched into a high impedance state, under the control of the controller 31 over the ON/OFF states of the switching elements 32a to 32f constituting the switching mechanism 30.

In a conventional stepping motor including two coils as illustrated in FIGS. 12A to 12C, the two coils are connected to the circuit all the time, resulting in a constant electrical loop between the coils. When driving pulses are applied to one of the coils, the inductance occurs in the other coil in response to the rotation of the rotor. Such inductance obstructs the rotation of the rotor. In other words, if driving pulses are applied to only one of the coils constantly connected to the circuit, the reactance occurring in the other coil in response to the rotation of the rotor driven by the one coil obstructs the rotation of the rotor.

Such reactance obstructs the rotation of the rotor at high speed, and consumes the power supplied for rotating the rotor, so that the rotation of the rotor requires an additional amount of energy.

In contrast, according to the embodiment, while driving pulses are being applied to one of the coils 22 (e.g., the first coil 22a), the current path to the other coil 22 (e.g., the second coil 22b) is broken to switch the other coil 22 into a high impedance state.

The other coil 22 (e.g., the second coil 22b) generates no reactance and thus does not obstruct the rotation of the rotor 5, so that the rotor 5 can rotate by a predetermined step angle (180° in the embodiment) at high speed.

No reactance occurring in the other coil 22 (e.g., the second coil 22b) can reduce the loss in the energy required for rotating the rotor 5, leading to further energy saving in the stepping motor 100.

Second Embodiment

The stepping motor according to a second embodiment of the invention will now be described with reference to FIGS. 8 to 11. The second embodiment differs from the first embodiment only in the configurations of the stator-side stoppers and the rotor. The following description focuses on differences from the first embodiment.

Figure 8:
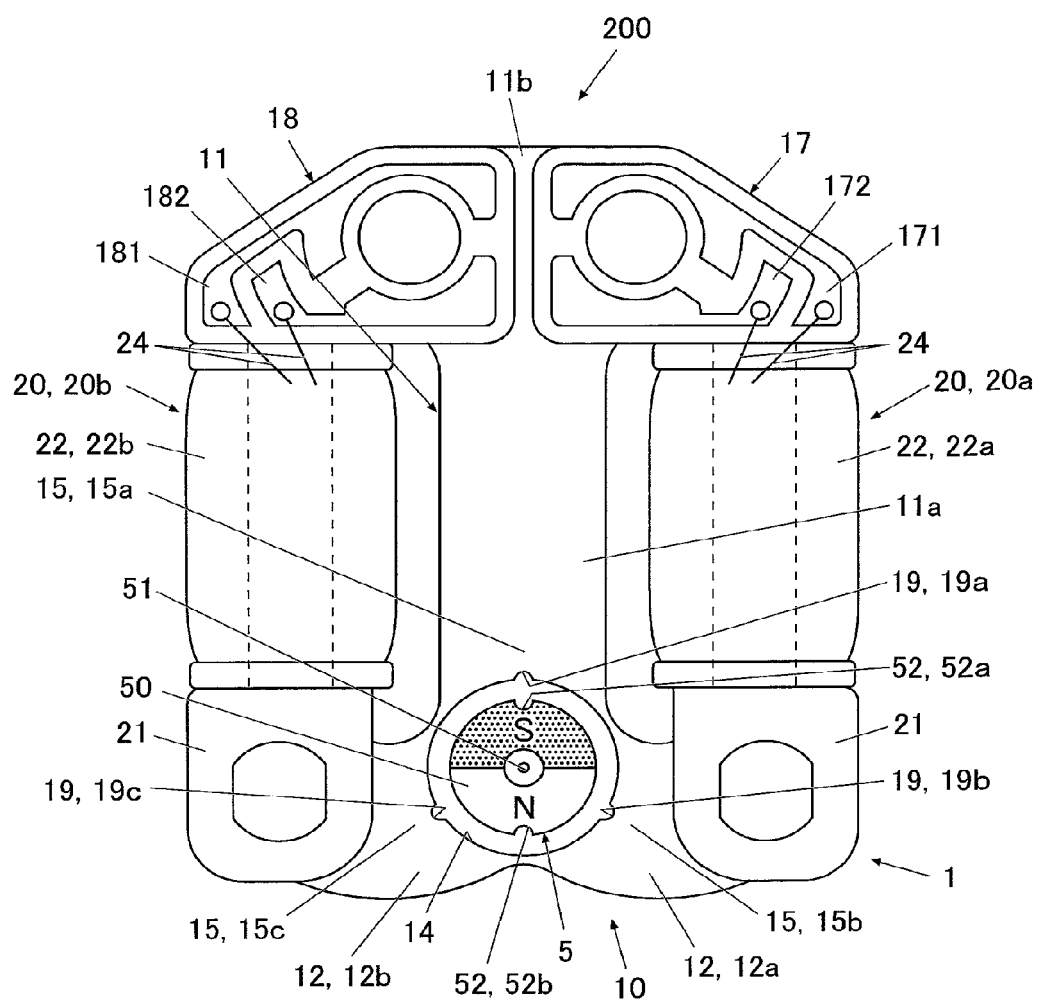
FIG. 8 is a plane view of a stepping motor according to a second embodiment.

FIG. 8 is a plan view of the stepping motor according to the second embodiment.

With reference to FIG. 8, a stepping motor 200 according to the embodiment includes a stator 1 including a stator body 10 (including three yokes, i.e., a center yoke 11, a side yoke 12a, and a side yoke 12b) and two coil blocks 20 (first coil block 20a and second coil block 20b), and a rotor 5 rotatably accommodated in a rotor accommodating space 14 of the stator body 10, just like the first embodiment.

In an excited state, the stator body 10 according to the embodiment has three magnetic poles 15, i.e., a first magnetic pole 15a in the center yoke 11, a second magnetic pole 15b in the side yoke 12a, and a third magnetic pole 15c in the side yoke 12b, at even intervals of approximately 120° along the periphery of the rotor magnet 50 of the rotor 5 accommodated in the rotor accommodating space 14.

According to the embodiment, the three magnetic poles 15, i.e., the first magnetic pole 15a, the second magnetic pole 15b, and the third magnetic pole 15c are uniformly disposed at even intervals of approximately 120° along the periphery of the rotor magnet 50; hence, the flows of magnetic fluxes from the rotor magnet 50 through the magnetic poles 15 during a non-energized state of the coils 22 are stabilized at every 60° (where the south pole or north pole of the rotor magnet 50 faces any one of the magnetic poles 15 of the stator body 10). The detent torque to stop the rotor 5 thus rises at every 60°.

The stator 1 has first notches 19 that define stator-side stoppers to maintain the static state of the rotor 5.

The stator-side stoppers are disposed at the tops of the respective magnetic poles 15 (first magnetic pole 15a, second magnetic pole 15b, and third magnetic pole 15c) in the three yokes (center yoke 11, side yoke 12a, and side yoke 12b) of the stator body 10, the tops facing the rotor magnet 50. In response to the rotation of the rotor 5, the stator-side stoppers each can face any one of the second notches 52 (52a and 52b) defining rotor-side stoppers in the rotor 5.

According to the embodiment, the stator 1 has three first notches 19 (first notches 19a, 19b, and 19c) provided at intervals of approximately 120° on the inner periphery around the rotor accommodating space 14, such that the first notches 19 respectively correspond to the three magnetic poles 15 (first magnetic pole 15a, second magnetic pole 15b, and third magnetic pole 15c).

The rotor magnet 50 according to the embodiment has second notches 52 (second notches 52a and 52b) at the respective substantial circumferential centers of the south pole and the north pole (i.e., the tops of the magnetic poles) on the periphery of the rotor magnet 50.

The second notches 52 define rotor-side stoppers to maintain the static state of the rotor 5.

According to the embodiment, when one of the second notches 52 (second notch 52a or 52b) faces one of the first notches 19 (first notch 19a, 19b, or 19c) of the stator 1, high index torque (holding torque) occurs to maintain the static state of the rotor 5 at its current position.

The first notches 19a, 19b, and 19c are disposed at intervals of approximately 120°, while the second notches 52a and 52b are disposed at the tops of the magnetic poles of the bipolarly-magnetized rotor magnet 50; hence, one of the second notches 52 (second notch 52a or 52b) faces one of the first notches 19 (first notch 19a, 19b, or 19c) of the stator 1 every 60° rotation.

In the stepping motor 200 according to the embodiment, the rotor 5 rotates by a step angle of 60° every application of driving pulses to the coils 22.

The other components, such as the controller 31 and the motor driving circuit 32, are identical to those in the first embodiment and thus are referred to by the same reference signs without redundant description.

The operation of the stepping motor 200 according to the second embodiment will now be explained with reference to FIGS. 9A to 9C and 10.

Figure 9A:
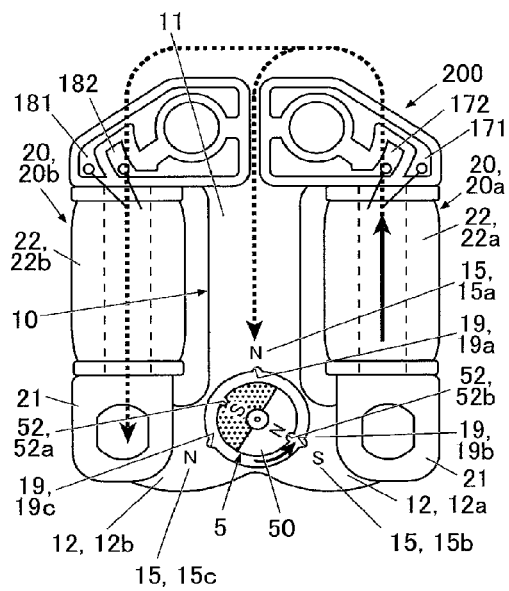
FIGS. 9A to 9C are plan views illustrating the operation of the stepping motor in FIG. 8.
Figure 9C:
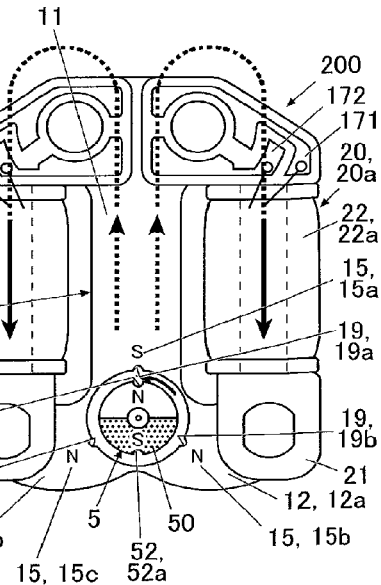
Figure 9B:
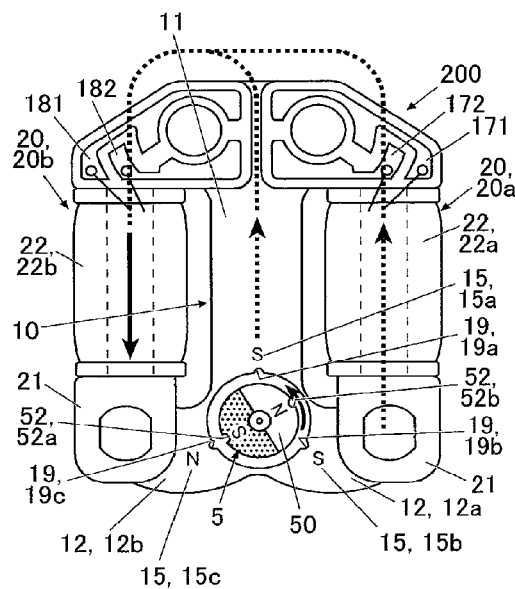

In FIGS. 9A to 9C, the rotor 5 rotates counterclockwise from the initial position where the south pole of the rotor magnet 50 is closest to the first magnetic pole 15a (as illustrated in FIG. 8). In FIGS. 9A to 9C, the solid arrows indicate the directions of the magnetic fluxes generated from the coils 22, while the broken arrows indicate the flows of the magnetic fluxes through the stator 1.

In the magnetically stable initial state where the south pole of the rotor magnet 50 is closest to the first magnetic pole 15a (as illustrated in FIG. 8), the first magnetic pole 15a facing the south pole of the rotor magnet 50 is the north pole whereas the other two magnetic poles (second magnetic pole 15b and third magnetic pole 15c) are the south poles.

In order to rotate the rotor 5 from the initial state (initial position) 60° in the reverse direction (counterclockwise direction), just like the first embodiment as illustrated in FIG. 3A, the controller 31 turns on the switching element 32a connected between the power source V and the first coil terminal 171 of the first coil 22a and the switching element 32d connected between the ground GND and the second coil terminal 172 of the first coil 22a, and turns off or maintains the OFF states of the switching element 32c connected between the power source V and the second coil terminal 172 of the first coil 22a, the switching element 32e connected between the power source V and the second coil terminal 182 of the second coil 22b, the switching element 32b connected between the ground GND and the first coil terminal 181 of the second coil 22b, and the switching element 32f connected between the ground GND and the second coil terminal 182 of the second coil 22b. In such a state, the controller 31 applies first driving pulses to the first coil 22a (during the "period of first driving pulses" in FIG. 10).

With reference to FIG. 9A, the magnetic flux having a direction illustrated with a solid arrow is generated from the first coil 22a, and flows through the stator body 10 and the magnetic cores 21 as illustrated with broken arrows, to reverse the third magnetic pole 15c into the north pole. The north pole of the rotor magnet 50 repels the third magnetic pole 15c and is attracted by the second magnetic pole 15b, so that the rotor 5 rotates. The second coil 22b in a high impedance state generates no reactance, and thus does not obstruct the rotation of the rotor 5 driven by the first coil 22a. After the rotor 5 rotates −60° from the initial position, the rotor 5 stops its rotation at a magnetically stable position where the first notch 19b faces the second notch 52b.

Just like the first embodiment as illustrated in FIG. 3B, the controller 31 then turns on the switching element 32e connected between the power source V and the second coil terminal 182 of the second coil 22b and the switching element 32b connected between the ground GND and the first coil terminal 181 of the second coil 22b, and turns off or maintains the OFF states of the switching element 32a connected between the power source V and the first coil terminal 171 of the first coil 22a, the switching element 32c connected between the power source V and the second coil terminal 172 of the first coil 22a, the switching element 32d connected between the ground GND and the second coil terminal 172 of the first coil 22a, and the switching element 32f connected between the ground GND and the second coil terminal 182 of the second coil 22b. In such a state, the controller 31 applies second driving pulses to the second coil 22b (during the "period of second driving pulses" in FIG. 10).

With reference to FIG. 9B, the magnetic flux having a direction illustrated with a solid arrow is generated from the second coil 22b, and flows through the stator body 10 and the magnetic cores 21 as illustrated with broken arrows, to reverse the first magnetic pole 15a into the south pole. The south pole of the rotor magnet 50 repels the first magnetic pole 15a and is attracted by the third magnetic pole 15c, so that the rotor 5 rotates. The first coil 22a in a high impedance state generates no reactance, and thus does not obstruct the rotation of the rotor 5 driven by the second coil 22b. After the rotor 5 rotates −120° from the initial position, the rotor 5 stops its rotation at a magnetically stable position where the first notch 19c faces the second notch 52a.

Just like the first embodiment as illustrated in FIG. 3C, the controller 31 then turns on the switching element 32c connected between the power source V and the second coil terminal 172 of the first coil 22a, the switching element 32e connected between the power source V and the second coil terminal 182 of the second coil 22b, and the switching element 32b connected between the ground GND and the first coil terminal 171 or 181 of the first or second coil 22a or 22b, and turns off or maintains the OFF states of the switching element 32a connected between the power source V and the first coil terminal 171 or 181 of the first or second coil 22a or 22b, the switching element 32d connected between the ground GND and the second coil terminal 172 of the first coil 22a, and the switching element 32f connected between the ground GND and the second coil terminal 182 of the second coil 22b. In such a state, the controller 31 applies third driving pulses to the first coil 22a and the second coil 22b (during the "period of third driving pulses" in FIG. 10).

With reference to FIG. 9C, the magnetic fluxes having directions illustrated with solid arrows are generated from the first coil 22a and the second coil 22b, and flow through the stator body 10 and the magnetic cores 21 as illustrated with broken arrows, to reverse the second magnetic pole 15b into the north pole. The north pole of the rotor magnet 50 repels the second magnetic pole 15b and is attracted by the first magnetic pole 15a, so that the rotor 5 further rotates in the reverse direction. After the rotor 5 rotates −180° from the initial position, the rotor 5 stops its rotation at a magnetically stable position where the first notch 19a faces the second notch 52b.

In order to rotate the rotor 5 by 60° clockwise, the ON/OFF states of the switching elements 32a to 32f are controlled through the same process as that in the first embodiment; hence, the redundant explanation of the process is omitted.

With reference to FIG. 10, the controller 31 applies the first driving pulses to the first coil 22a, applies the second driving pulses to the second coil 22b, and then applies the third driving pulses to the two coils 22a and 22b. Under the driving pulses simultaneously or sequentially applied to the coils 22, the rotor 5 can rotate by a step angle of 60° (−60°) at high accuracy.

With reference to FIG. 11, the controller 31 may control the first coil 22a and the second coil 22b to be in a high impedance state during a period of inertia rotation after every application of the first, second, or third driving pulses. The period of inertia rotation after every application of the driving pulses allows the controller 31 to control the rotor 5 to smoothly rotate 60° (−60°) with low power consumption.

The other operations are identical to those in the first embodiment and the redundant explanation thereof is omitted.

As described above, the second embodiment can provide the same advantageous effects as the first embodiment and additional advantageous effects below.

The rotor 5 according to the second embodiment can rotate by a unit angle (step angle) of 60° at high accuracy, leading to precise control of the rotation angle.

For example, if the stepping motor 100 drives a hand driving mechanism for driving a hand of a timepiece, the rotor 5 rotating by a step angle of 180° requires significant deceleration with gears to drive the hand by a small step angle. For example, the rotor 5 rotating by a step angle of 180° requires 1/180 deceleration to drive the hand by a step angle of 1°. In contrast, if the rotor 5 can rotate by a unit angle of 60° as in the second embodiment, the rotor 5 requires only 1/60 deceleration to drive the hand by a step angle of 1°, for example. This configuration can drive the hand by a small step angle without many gears for significant deceleration. In general, a second hand operates by a step angle of 6°. If the stepping motor 200 according to the embodiment drives a hand driving mechanism for driving such a second hand, the second hand can operate by a step angle of 2°. This configuration can smoothly drive the hand with reduced vibrations.

The stepping motor 200 according to the embodiment requires a reduced number of components such as the gears for deceleration, leading to cost reduction. The reduction in the number of components such as the gears also leads to the efficient use of a space inside a device for accommodating the stepping motor 200, so that the device can be reduced in size and thickness. The reduction in the number of mechanical components, such as the gears constituting the speed adjustment mechanism coupled to the stepping motor 200, can also reduce the cumulative backlash. This configuration can thus improve the accuracy of the operation of the hand driving mechanism driven by the stepping motor 200.

According to the embodiment, the stator-side stoppers are defined by the first notches 19 provided on the inner periphery of the stator 1 around the rotor accommodating space 14, while the rotor-side stoppers are defined by the second notches 52 provided at the tops of the magnetic poles 15 along the periphery of the rotor magnet 50. These stoppers to certainly stop the rotor 5 can be provided through relatively simple processes.

In general, manufacturing of a multipolarly-magnetized rotor requires a complicated and expensive metal mold and magnetizer. In contrast, the stepping motor 200 according to the embodiment includes the bipolarly-magnetized rotor magnet 50 and achieves the rotation by a unit angle of 60° with a simple structure, and can be manufactured through relatively simple processes at low cost.

The invention should not be limited to the embodiments described above, and the embodiments may be variously modified within the gist of the invention.

For example, the stepping motor according to the above embodiments includes two coils 22 (first coil 22a and second coil 22b). While driving pulses are being applied to one of the coils 22 (e.g., the first coil 22a), the switching mechanism 30 switches the other coil 22 (e.g., the second coil 22b) into a high impedance state. Alternatively, the stepping motor may include any number of coils rather than the two coils.

The stepping motor may include three or more coils, and simultaneously or sequentially apply driving pulses to the coils to rotate the rotor by a predetermined step angle. In this case, while the driving pulses are being applied to some of the multiple coils, the switching mechanism 30 switches the rest of the coils not driven by the driving pulses into the high impedance state.

According to the embodiments, while driving pulses are being applied to one of the coils 22 (e.g., the first coil 22a), the ON/OFF states of the switching mechanism 30 are controlled to continuously maintain the high impedance state of the other coil 22 (e.g., the second coil 22b). Alternatively, the ON/OFF states of the switching mechanism 30 may be controlled through any other scheme.

For example, after the completion of the rotation of the rotor 5 by a predetermined step angle (e.g., 60°) under driving pulses applied to one of the coils 22 (e.g., the first coil 22a), the ON/OFF states of the switching mechanism 30 may be controlled to switch the other coil 22 (e.g., the second coil 22b) from the high impedance state into the state of being connected to the ground GND.

If the other coil 22 (e.g., the second coil 22b) is switched from the high impedance state into the grounded state upon the completion of the rotation of the rotor 5 by any predetermined step angle under driving pulses applied to the one coil 22 (e.g., the first coil 22a), free vibrations of the rotor 5 can provide back electromotive force.

According to the embodiments, the components of the stator 1, i.e., the stator body 10, the first coil block 20a, and the second coil block 20b, are separately prepared and are magnetically connected to one another. Alternatively, the stator 1 may have any other configuration.

For example, the stator may include a stator body and a single coil block including a single long magnetic core.

In this case, if the stator body includes a center yoke and a pair of side yokes just like the above embodiments, for example, the substantial center of the magnetic core of the coil block is magnetically connected to the center yoke of the stator body, first and second coils are provided on both sides of the connection, one end of the magnetic core is magnetically connected to one end of one of the side yokes, and the other end of the magnetic core is magnetically connected to one end of the other side yoke.

The stator having such configuration can be composed of a reduced number of components compared to the stator including a pair of coil blocks.

Alternatively, a stator where the stator body and the first and second coil blocks are integrally formed may be used. In this case, for example, the stator body and the magnetic cores of the first and second coil blocks are integrated.

The shapes and configurations of the stator and its components, i.e., the stator body and the first and second coil blocks should not be limited to those in the embodiments and may be appropriately modified.

The stator-side stoppers according to the first and second embodiments and the rotor-side stoppers according to the second embodiment may have any shapes other than those in the embodiments, provided that the stoppers provide sufficient index torque (holding torque) to maintain the static state of the rotor 5.

According to the embodiments, the stepping motor 100 or 200 drives the hand driving mechanism for the hands of the timepiece.

Figure 13:
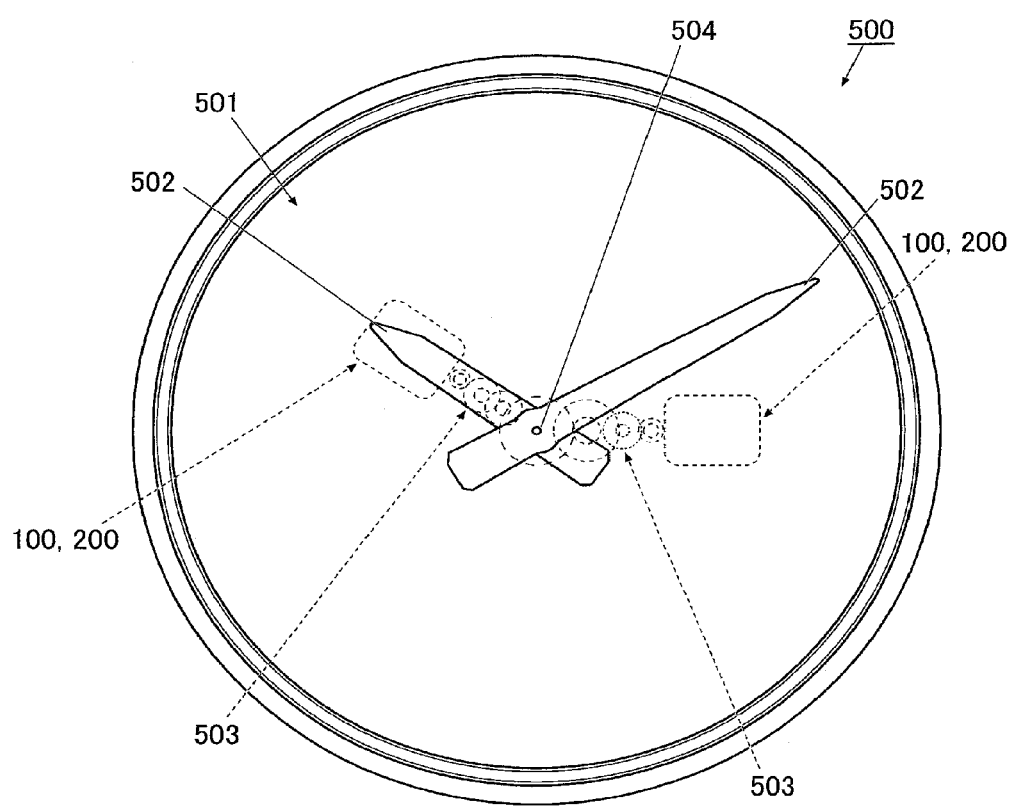
FIG. 13 is a plan view of an exemplary timepiece including a stepping motor according to an embodiment.

For example, with reference to FIG. 13, when the stepping motor 100 or 200 according to the embodiments is installed in a timepiece 500 including an analogue indicator 501, the rotary shaft 51 of the rotor 5 is coupled to gears of a hand driving mechanism (gear train mechanism) 503 for driving hands 502 (although FIG. 13 illustrates only an hour hand and a minute hand, the hands may have any other configuration). In response to the rotation of the rotor 5 of the stepping motor 100 or 200 transmitted through the hand driving mechanism 503, the hands 502 rotate on the analogue indicator 501 around a hand shaft 504.

In the stepping motor 100 or 200 according to the embodiments that drives the hand driving mechanism of the timepiece, even if the stepping motor 100 or 200 includes two coils 22, the rotation of the rotor 5 can be readily and accurately detected, so that the rotation of the stepping motor 100 or 200 can be controlled at high precision. This configuration leads to high-precision driving of the hands.

The stepping motor 100 or 200 may drive any device other than the hand driving mechanism of the timepiece.

The invention should not be limited to the embodiments described above, and the embodiments may be appropriately modified.

The invention is not intended to be limited to the embodiments described above but rather is defined by the following claims and equivalents thereof.

The entire disclosure of Japanese Patent Application No. 2013-195233 filed on Sep. 20, 2013 including description, claims, drawings, and abstract are incorporated herein by reference in its entirety.

What is claimed is:

1. A stepping motor, comprising:
   a rotor;
   a plurality of coils; and
   a switching mechanism, wherein
   the stepping motor simultaneously or sequentially applies driving pulses to the coils to rotate the rotor by a predetermined step angle, and
   while the driving pulses are being applied to part of the coils, the switching mechanism switches the rest of the coils other than the part of the coils driven by the driving pulses into a high impedance state.

2. The stepping motor according to claim 1, wherein
   the rotor is bipolarly-magnetized in a radial direction,
   the plurality of coils consists of a first coil and a second coil, and
   while the driving pulses are being applied only to the first coil, the switching mechanism switches the second coil constituting the rest of the coils into the high impedance state.

3. The stepping motor according to claim 1, wherein the plurality of coils be in the high impedance state during a period of inertia rotation after the driving pulses are applied.

4. The stepping motor according to claim 1, wherein after the rotor rotates by the predetermined step angle, the switching mechanism switches the rest of the coils into a grounded state.

5. A timepiece, comprising:
   a stepping motor comprising:
      a stator including a stator body and coils;
      rotor stoppers each of which provided every predetermined rotation angle, the predetermined rotation angle being smaller that an angle obtained by dividing one rotation by a product of M which is an even number referring to a number of magnetization in the rotor and N which is a number referring to a number of magnetic poles in the stator;
      a driving pulse supplying circuit which applies driving pulses to the coils to rotate the rotor by the predetermined rotation angle; and
      a controller which controls the driving pulse supplying circuit;
   hands; and
   a gear train mechanism which is coupled with the hands and which is driven in response to rotation of the stepping motor,
   wherein
   the stator body includes a rotor which includes a cylindrical rotor magnet having an even number of magnetization in a radial direction and a rotor accommodating space which accommodates the rotor, the stator body having an odd number of magnetic poles along a periphery of the rotor, and
   the coils are magnetically connected with the stator body.

* * * * *